(12) United States Patent
Eftekhari et al.

(10) Patent No.: US 8,407,113 B1
(45) Date of Patent: Mar. 26, 2013

(54) INFERENCE-BASED TAX PREPARATION

(75) Inventors: Amir Eftekhari, San Diego, CA (US);
Carol Ann Howe, San Diego, CA (US);
Jane L. Ryder, San Diego, CA (US);
Alan Brian Tifford, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 261 days.

(21) Appl. No.: 12/797,574

(22) Filed: Jun. 9, 2010

(51) Int. Cl.
*G06F 17/22* (2006.01)
*G07F 19/00* (2006.01)
(52) U.S. Cl. .......................................................... 705/31
(58) Field of Classification Search ........................ None
See application file for complete search history.

(56) References Cited

U.S. PATENT DOCUMENTS

| | | | | |
|---|---|---|---|---|
| 7,539,635 | B1 * | 5/2009 | Peak et al. .................. | 705/31 |
| 2004/0032486 | A1 * | 2/2004 | Shusman .................. | 348/14.09 |
| 2004/0167835 | A1 * | 8/2004 | Yaur .............................. | 705/31 |
| 2005/0038722 | A1 * | 2/2005 | Throndson et al. ............ | 705/31 |
| 2006/0178961 | A1 * | 8/2006 | Stanley et al. .................. | 705/31 |
| 2007/0094207 | A1 * | 4/2007 | Yu et al. .......................... | 706/47 |
| 2007/0136157 | A1 * | 6/2007 | Neher et al. ................... | 705/31 |
| 2008/0201269 | A1 * | 8/2008 | Hollins et al. ............. | 705/36 R |
| 2008/0228641 | A1 * | 9/2008 | Fredman ......................... | 705/39 |
| 2011/0055196 | A1 * | 3/2011 | Sundelin et al. .............. | 707/711 |

* cited by examiner

*Primary Examiner* — Ryan Zeender
*Assistant Examiner* — Kristie A Mahone
(74) *Attorney, Agent, or Firm* — Osha Liang LLP

(57) ABSTRACT

A method for operating a tax inference engine involves receiving tax data items, assigning confidence ratings to the tax data items using inference rules, and assigning relevance ratings to tax questions using the inference rules. The method further involves determining tax questions having ratings that exceed a threshold amount, and ordering the tax questions by the relevance ratings, personalizing a tax question using the inference rules, tax data items, and confidence ratings by altering a wording of the tax question, and determining tax advice using the inference rules, the tax data items, and the confidence ratings.

26 Claims, 7 Drawing Sheets

INFERENCE-BASED TAX PREPARATION

BACKGROUND

Taxes are a complicated part of everyone's lives. In fact, taxes have become so complicated that the vast majority of taxpayers turn to a professional accountant, a tax preparation software program, or both to prepare and file the taxpayer's tax return. Professional accountants offer the best detailed, personalized information, and advice available, but at the same time, can be very expensive. Tax preparation software programs, while cheaper than professional accountants, tend to ask each user the exact same questions and provide no detailed, personalized information or advice to the user.

SUMMARY

In general, in one aspect, the invention relates to a method for operating a tax inference engine. The method involves receiving, by a tax inference engine executing on a processor, a plurality of tax data items, assigning, by the tax inference engine, a plurality of confidence ratings to the plurality of tax data items by applying a plurality of inference rules, assigning, by the tax inference engine, a plurality of relevance ratings to a plurality of tax questions by applying the plurality of inference rules, determining a subset of the plurality of tax questions, wherein each tax question of the subset comprises a relevance rating of the plurality of relevance ratings that exceeds a threshold amount, and wherein the subset is ordered by the plurality of relevance ratings, personalizing a tax question of the subset using at least the plurality of inference rules, the plurality of tax data items, and the plurality of confidence ratings, wherein personalizing the tax question alters a wording of the tax question, and determining tax advice using at least the plurality of inference rules, the plurality of tax data items, and the plurality of confidence ratings.

In general, in one aspect, the invention relates to a method for completing a tax return. The method involves obtaining, by a tax preparation application executing on a processor, a plurality of tax data items for a user, populating, by the tax preparation application, a first portion of the tax return using the plurality of tax data items and a second portion of the tax return using an inference based on the plurality of tax data items, prompting, by the tax preparation application, the user with a tax question of a plurality of tax questions, using at least a plurality of rules and the plurality of tax data items, wherein the tax question is personalized by altering a wording of the tax question, wherein the tax question is of a subset of the plurality of tax questions, and wherein the subset of the plurality of tax questions is ordered by a plurality of relevance ratings, receiving an answer to the tax question, populating, by the tax preparation application, a third portion of the tax return using the answer, displaying a tax advice item to the user, and displaying a prepared tax return to the user.

In general, in one aspect, the invention relates to a non-transitory computer readable storage medium comprising computer executable instructions for operating an inference engine. The instructions comprising functionality to receive a plurality of tax data items, assign a plurality of confidence ratings to the plurality of tax data items by applying a plurality of inference rules, assign a plurality of relevance ratings to a plurality of tax questions by applying the plurality of inference rules, determine a subset of the plurality of tax questions, wherein each tax question of the subset comprises a relevance rating of the plurality of relevance ratings that exceeds a threshold amount, and wherein the subset is ordered by the plurality of relevance ratings, personalize a tax question of the subset using at least the plurality of inference rules, the plurality of tax data items and the plurality of confidence ratings, wherein personalizing the tax question alters a wording of the tax question, and determine tax advice using at least the plurality of inference rules, the plurality of tax data items, and the plurality of confidence ratings.

In general, in one aspect, the invention relates to a non-transitory computer readable storage medium comprising computer executable instructions for completing a tax return. The instructions comprising functionality to obtain a plurality of tax data items for a user, populate a first portion of the tax return using the plurality of tax data items and a second portion of the tax return using an inference based on the plurality of tax data items, prompt the user with a tax question of a plurality of tax questions, personalized using at least a plurality of rules and the plurality of tax data items, wherein personalized comprises altering a wording of the tax question, wherein the tax question is of a subset of the plurality of tax questions, and wherein the subset of the plurality of tax questions is ordered by a plurality of relevance ratings, receive an answer to the tax question, populate a third portion of the tax return using the answer, display a tax advice item to the user, and display a prepared tax return to the user.

In general, in one aspect, the invention relates to a system. The system comprises a memory, and a processor, operatively connected to the memory and configured to execute instructions for a tax inference engine configured to receive a plurality of tax data items, assign a plurality of confidence ratings to the plurality of tax data items by applying a plurality of inference rules, assign a plurality of relevance ratings to the plurality of tax questions by applying the plurality of inference rules, determine a subset of the plurality of tax questions, wherein each tax question of the subset comprises a relevance rating of the plurality of relevance ratings that exceeds a threshold amount, and wherein the subset is ordered by the plurality of relevance ratings, personalize a tax question of the subset using at least the plurality of inference rules, the plurality of tax data items, and the plurality of confidence ratings, wherein personalizing the tax question alters a wording of the tax question, and determine tax advice using at least the plurality of inference rules, the plurality of tax data items, and the plurality of confidence ratings, a tax preparation application configured to, obtain the plurality of tax data items for a user, populate a first portion of a tax return using the plurality of tax data items and a second portion of the tax return using an inference based on the plurality of tax data items, prompt the user with the tax question of the subset, receive an answer to the tax question, populate a third portion of the tax return using the answer, display the tax advice to the user, and display a prepared tax return to the user.

Other aspects of the invention will be apparent from the following detailed description and the appended claims.

DETAILED DESCRIPTION

Figure 1:
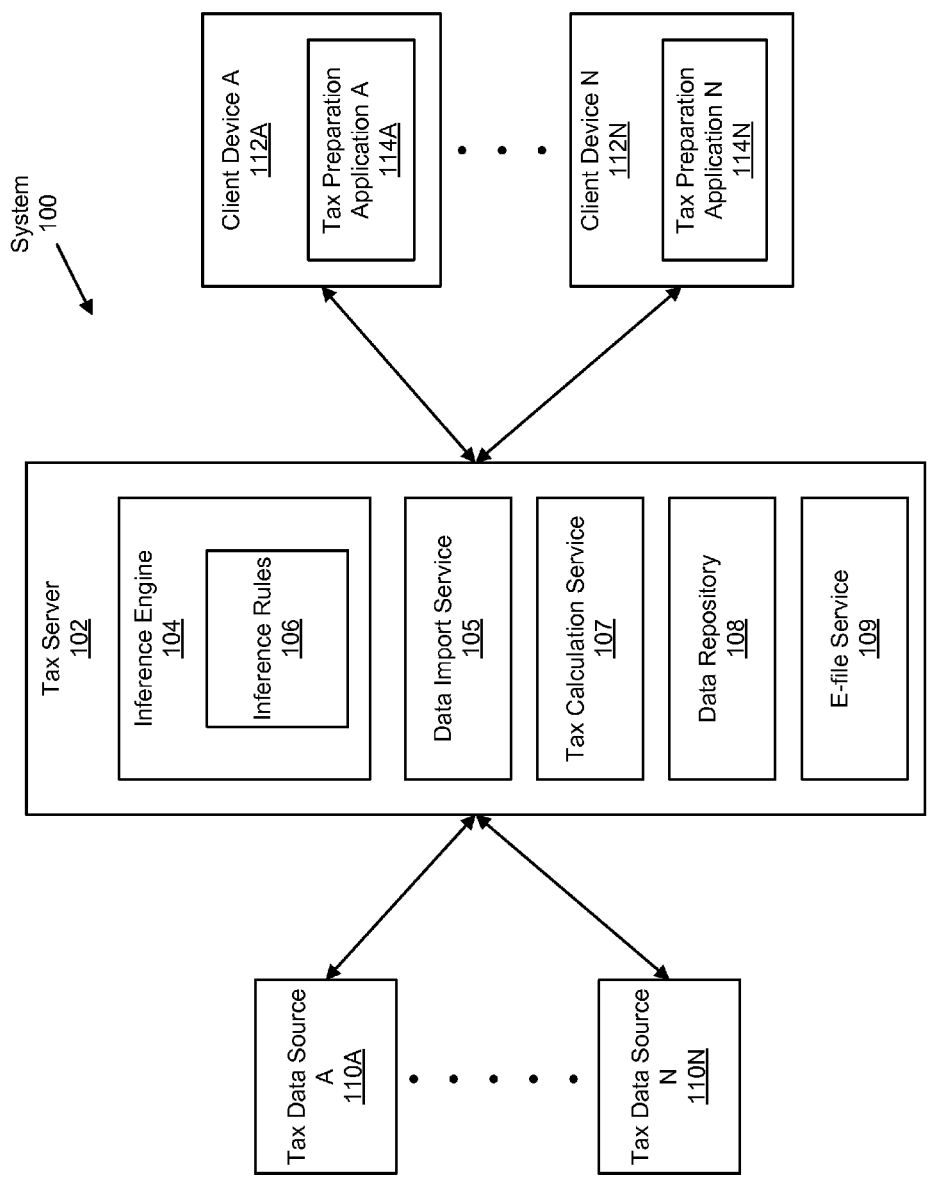
FIG. 1 shows a flow diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide for a system and method of completing a tax return using an inference engine. Specifically, the system and method allow for data collection at any time and in any order, relieve the taxpayer from performing the majority of the work, provide personalized advice, and ask personalized questions. These features enable the taxpayer to merely spend time reviewing his or her tax documents, rather than preparing his or her tax documents. Throughout the following detailed description, the terms "user" and "taxpayer" may be used interchangeably. In one or more embodiments of the invention, the "user" of the system may be the same as the "taxpayer." Alternatively, the "user" of the system may be different from the "taxpayer" where the user is an agent of the taxpayer or someone performing all or a portion of the method or system on behalf of the taxpayer.

FIG. 1 shows a diagram of a system in accordance with one or more embodiments of the invention. As shown in FIG. 1, the system (100) includes a Tax Server (102) with an Inference Engine (104) including Inference Rules (106), a Data Import Service (105), a Tax Calculation Service (107), a Data Repository (108), and an E-file Service (109) in accordance with one or more embodiments of the invention. The system (100) further includes a Tax Data Source A (110A) and a Tax Data Source N (110N), as well as a Client Device A (112A) and a Client Device N (112N) with a Tax Preparation Application A (114A) and a Tax Preparation Application N (114N), respectively in accordance with one or more embodiments of the invention. Each of the aforementioned components of FIG. 1 is discussed below.

The Tax Server (102) may be any device with a processor and a memory including, but not limited to, a server, a desktop computer, a laptop computer, a smart phone, etc. In one or more embodiments of the invention, the Tax Server (104) is in the form of the computer system shown in FIG. 6 and described below. In one or more embodiments of the invention, the Tax Server (102) is communicatively connected with tax data sources (i.e., Tax Data Source A (110A) and Tax Data Source N (110N)) and client devices (i.e., Client Device A (112A) and Client Device N (112N)) in accordance with one or more embodiments of the invention. The Tax Server (102) may be communicatively connected using any wired or wireless connection including, but not limited to, a Local Area Network (LAN), a Wide Area Network (WAN), the Internet, telephony networks, and/or any other suitable communication medium.

In one or more embodiments of the invention, the Tax Server (102) includes a Data Import Service (105). The Data Import Service may be configured to collect the tax data sources from any source, including the client devices, and pass along the tax data to other components of the Tax Server (102) including the Inference Engine (104). The Data Import Service (105) may also be configured to convert the data format to the format accepted for processing by the Inference Engine (104) and storage in the Data Repository (108). In one or more embodiments of the invention, the Data Import Service may be located on the client device(s) or at least have a component that interacts with an application (e.g., Tax Preparation Application A (114A) and a Tax Preparation Application N (114N)) located on the client device(s).

In one or more embodiments of the invention, the Tax Server (102) includes a Tax Calculation Service (107). The Tax Calculation Service (107) may be configured to assist the Tax Server (102) and/or applications executing on the client device (e.g., the Tax Preparation Application A (114A) and a Tax Preparation Application N (114N)) to determine the tax liability of a taxpayer and maintain the logic necessary and tax rules/laws to calculate tax liability (and/or savings) for the current tax year, prior year taxes, and possibly forecast future tax years. The Tax Calculation Service (107) also interacts with other components of the Tax Server (102) including the Inference Engine (104), which requires tax calculations and applies the tax rules to make the inferences in accordance with one or more embodiments of the invention.

In one or more embodiments of the invention, the Tax Server (102) includes a Data Repository (108). In one or more embodiments of the invention, the Data Repository (108) may be any non-transitory storage device including, but not limited to, a hard drive, memory, CD-ROMs, DVDs, flash drives, database management system, or any other suitable device/component. The Data Repository (108) may store any data sent and/or received by the Tax Sever (102), as well as store any information used and/or created by the Inference Engine (104).

In one or more embodiments of the invention, the Tax Server (102) includes a Tax E-file Service (109). The Tax E-file Service (109) is configured to allow taxpayer's prepared tax return to be filed electronically with an appropriate tax authority (e.g., Federal tax authority (e.g. Internal Revenue Service (IRS)), state tax authority (e.g. Franchise Tax Board), local and/or municipal tax authority (e.g., County Tax Appraisal Office, City Tax Office, etc.) upon the prepared return being validated by the user. Validation may change depending on the tax authority, but validation simply involves making sure the fields of the tax preparation application are filled with the proper contents (and the proper combination of entries) and all necessary fields are completed. In one or more embodiments of the invention, the electronic filing with the tax authority may be facilitated directly on the Tax Server (102) or on a client device using the Tax Preparation Application A (114A), which may be interconnected with the Tax Server (102) depending on the requirements of the tax authority and/or the Tax Server (102).

In one or more embodiments of the invention, the Inference Engine (104) is a software application executing as instructions or logic on the Tax Server (102), and includes a component referred to as the Inference Rules (106). Alternatively, the Inference Engine (104) and the component referred to as the Inference Rules (106) may be located on and/or executing as instructions or logic on a client device (i.e., Client Device A (112A) and Client Device N (112N)). For example, the Inference Engine (104) and the component referred to as the Inference Rules (106) may be part of a tax preparation application (i.e., Tax Preparation Application A (114A) and Tax Preparation Application N (114N)). In one or more embodiments of the invention, the Inference Engine (104) is configured to process any tax data received by the Tax Server (102)

and making any inferences, recommendations, warnings, and/or other suggestions based on the received tax data.

In one or more embodiments of the invention, the Inference Engine (104) is configured to obtain tax data about a taxpayer. The Inference Engine (104) may automatically seek out and obtain tax data about a taxpayer. Alternatively, the taxpayer may manually enter the tax data, provide direction to the Inference Engine (104) regarding where to obtain tax data, or any combination of the above. In one or more embodiments of the invention, this function may be performed by a tax preparation application (i.e., Tax Preparation Application A (114A) and Tax Preparation Application N (114N)). In one or more embodiments of the invention, the Inference Engine (104) may have a set of stored tax questions, relating to the various aspects of taxes and filing taxes. The Inference Engine (104) may be configured to order the set of stored tax questions according to relevancy, and may use the stored tax questions as a basis for personalizing questions to individual users, as explained below.

In one or more embodiments of the invention, the Inference Engine (104) may assign any tax data received a weight, such as a confidence rating representing (a) how confident the Inference Engine (104) is that tax data and/or other financial data is accurate and/or valid, or (b) a relevancy rating generated by the Inference Engine (104) representing how relevant that a tax question and/or other financial question is relevant to the preparation of the tax return. In one or more embodiments of the invention, the Inference Engine (104) is able to determine the confidence and/or relevance using the Inference Rules (106).

For example, any tax data directly entered by the user may receive a weight of 1 (based on a pre-defined set of inference rules), or any other suitable number, to represent that the piece of tax data is of the highest accuracy and reliability. Alternatively, tax data received from a previously filed tax return from four years ago may be assigned a weight of 0.6 (based on a pre-defined set of inference rules), meaning that this piece of tax data is not considered to be as reliable. As another example, a tax question related to Mortgage Interest may be assigned a weight of 1 if the Mortgage Interest Statement has already been obtained from a financial institution to answer the tax question, meaning this question is very relevant. Alternatively, a tax question related to interest received by the taxpayer (via a 1099 form) may be assigned a weight of zero where nothing was retrieved from a financial institution or filed by the taxpayer in a previous tax return. In one or more embodiments of the invention, many different values of weights may be assigned and many different ways to represent confidence/relevancy and, as such, the invention should not be limited to the above examples.

Alternatively, any suggestions, warnings, or recommendations made by the Inference Engine (104) may also receive a weight in accordance with one or more embodiments of the invention. In one or more embodiments of the invention, the weighting may be performed in many different ways and, as such, the invention should not be limited to the above examples. Further, weights may be assigned individually or in groups, and each individual data item may have more than one weight associated with it in accordance with one or more embodiments of the invention. For example, a tax question about a taxpayer's mortgage may be associated with a group of tax questions relating to assets. Thus, a tax question about a taxpayer's mortgage may receive a weight for the individual question as well as for the group of tax questions. In one or more embodiments of the invention, many different groupings and ways to assign multiple weights to a single item exist and, as such, the invention should not be limited to the above examples.

In one or more embodiments of the invention, the Inference Engine (104) may apply the Inference Rules (106) to tax data to generate inferences. The inferences may involve inferring missing tax data, personalizing tax questions, prioritizing tax questions, providing warnings, providing tax advice, populating tax returns, and/or any other relevant aspect. It will be apparent to one of ordinary skill in the art that this is not an exhaustive listing of all the things that inferences made by the Inference Engine (104) may involve and, as such, the invention should not be limited to the above examples.

As an example of personalizing tax questions, assume that a taxpayer owned a home in the previous tax year and provided that information to the Inference Engine (104). The tax question, "Do you own a home," which would traditionally be asked may be personalized to "Did you move last year?" As another example, the question, "Who is the primary taxpayer?," which would traditionally be asked may be personalized to, "We have determined that John is the primary taxpayer, is this correct?". It will be apparent to one of ordinary skill in the art that there are many ways to personalize tax questions and, as such, the invention should not be limited to the above examples.

As an example of prioritizing tax questions, a 20 year old full-time student may be asked questions immediately about tuition (rather than income), as that is likely one of the most relevant tax questions to a 20 year old full-time student. In one or more embodiments of the invention, the tax questions with the lowest relevancy to the user may not be asked. Alternatively, all questions may be asked of the user, but in an order of most relevant to least relevant. It will be apparent to one of ordinary skill in the art that there are many ways to make inferences and, as such, the invention should not be limited to the above examples.

In one or more embodiments of the invention, the more tax data provided to the Inference Engine (104), the more accurate the inferences. In one or more embodiments of the invention, inferences may be made after each data item or document is input and/or after all data collection/entry is completed. In one or more embodiments of the invention, inferences may be disabled entirely or partially. For example, inferences may be disabled if a taxpayer indicated that an inference is incorrect. In one or more embodiments of the invention, the inferences are intended to make the process of using a tax preparation application as helpful, easy, and personalized as using a profession accountant.

The Inference Rules (106) may be a set of one or more rules used by the Inference Engine (106) to make inferences. In one or more embodiments of the invention, the Inference Rules (106) are stored as a data structure (e.g., an array, a list, a tree, a hash, a graph, etc.) in the Data Repository (108) and may be updated or changed at anytime. Alternatively, the Inference Rules (106) are coded into the structure of the Inference Engine (104) in accordance with one or more embodiments of the invention.

In one or more embodiments of the invention, the Inference Rules (106) are accessed from within the Inference Engine (104) (upon retrieval from the Data Repository (108)) while the Inference Engine (104) is executing on the Tax Server (102). The Inference Rules (106) may be assigned a weight, and may be updated based on feedback received on inferences made in either the current year or prior years' tax return(s). For example, if a taxpayer confirms that an inference is correct, the weight of that inference may be updated. Conversely, if a taxpayer indicates that an inference is incorrect, then the inference rule may be changed to make it more accurate and/or update the weight. In one or more embodiments of the invention, the Inference Rules (106) benefit from being able to collect feedback from a large group of taxpayers as part of a community, consortium, etc. thereby making the rules more accurate.

The Tax Data Source A (110A) and the Tax Data Source N (110N) may include any potential data source of financial (including tax) data. Examples of potential data sources of financial data may include, but are not limited to, government agencies, financial institutions, the IRS, state and local tax authorities, employers, payroll companies, stockbrokers, previous tax returns, credit card statements, financial websites, physical documents, and any other supplier of financial (including tax) data. It will be apparent to one of ordinary skill in the art that this is not an exhaustive listing of suppliers of tax or financial data and, as such, the invention should not be limited to the above examples.

The Tax Data Source A (110A) and the Tax Data Source N (110N) may be communicatively connected or otherwise accessible to the Tax Server (102) via any wired or wireless connection. The Tax Data Source A (110A) and the Tax Data Source N (110N) may also be communicatively connected or otherwise accessible to the Client Device A (112A) and the Client Device N (112N). In one or more embodiments of the invention, the Client Device A (112A) and the Client Device N (112N) may act as a tax data source, for example, by allowing the user to manually enter tax data.

The Client Device A (112A) and the Client Device N (112N) may be any device with a processor and a memory including, but not limited to, a server, desktop computer, laptop computer, cell phone, smart phone, Personal Digital Assistant, media player, handheld gaming device, and/or any other suitable device. In one or more embodiments of the invention, the Client Device A (112A) and the Client Device N (112N) may include a display, touch screen display, input devices such as a mouse or keyboard, storage devices, and/or any other suitable element. Further, in one or more embodiments of the invention, the Client Device A (112A) and the Client Device N (112N) are in the form of the computer system shown in FIG. 6 and described below. In one or more embodiments of the invention, the Client Device A (112A) and the Client Device N (112N) may be capable of executing the Tax Preparation Application A (114A) and the Tax Preparation Application N (114N), respectively.

The Tax Preparation Application A (114A) and the Tax Preparation Application N (114N) may present a Graphical User Interface (GUI) to the user to aid in preparing a tax return. In one or more embodiments of the invention, the Tax Preparation Application A (114A) and the Tax Preparation Application N (114N) may obtain tax data from the Tax Data Source A (110A), the Tax Data Source N (110N), and the user. In one or more embodiments of the invention, the Tax Preparation Application A (114A) and the Tax Preparation Application N (114N) may populate tax forms with data provided by the Inference Engine (104). In one or more embodiments of the invention, the Tax Preparation Application A (114A) and the Tax Preparation Application N (114N) may facilitate the filing of tax forms with data provided by the Inference Engine (104). Further, the Tax Preparation Application A (114A) and the Tax Preparation Application N (114N) may display tax questions and tax advice to the user, as well as receive responses.

The Tax Preparation Application A (114A) and the Tax Preparation Application N (114N) may include an inference engine (i.e., Inference Engine (104)), inference rules (i.e., Inference Engine (106)) or any of the above described functionality of the Inference Engine (104). In one or more embodiments of the invention, the Tax Preparation Application A (114A) and the Tax Preparation Application N (114N) may be located and execute on the Tax Server (102), rather than on a client device as depicted in FIG. 1.

Figure 2:
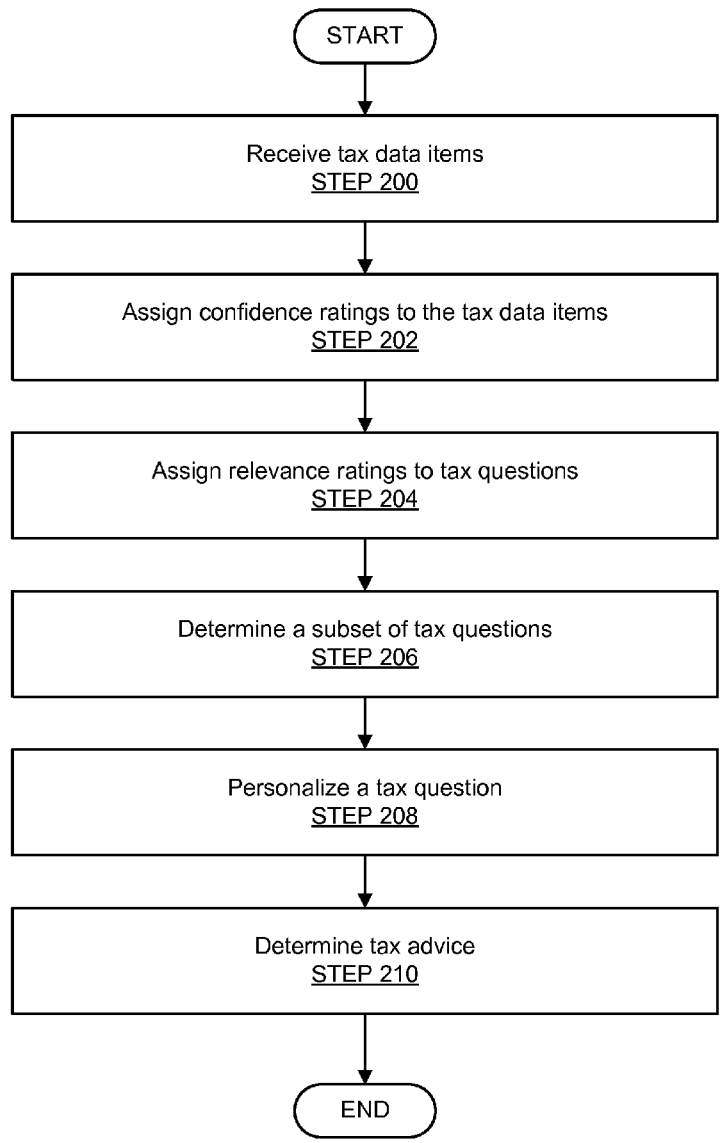
FIG. 2 shows a flowchart of a method for operating an inference engine in accordance with one or more embodiments of the invention.

FIG. 2 shows a flowchart of a method for operating a tax inference engine in accordance with one or more embodiments of the invention. The method of FIG. 2 may be implemented, for example, using the system of FIG. 1. In one or more embodiments of the invention, one or more of the steps shown in FIG. 2 may be omitted, repeated, and/or performed in a different order than the order shown in FIG. 2. Accordingly, the scope of the invention should not be considered limited to the specific arrangement of Steps shown in FIG. 2.

Initially, in Step 200, tax data items are received in accordance with one or more embodiments of the invention. In one or more embodiments of the invention, the tax data items may be received from one or more tax documents entered by the taxpayer or received from a tax data source. Examples of tax data sources include a government agency, financial institution, employer, payroll company, stockbroker, previous tax return, receipts, credit card statements, bills, invoices, charitable contribution donation records, documents obtained through OCR techniques, documents obtain through screen scraping of websites, and/or any other supplier or source of tax data. The tax data items may be received in any order (including an order set by the user), and at any time. An example of tax data items that may be processed by an interference engine is credit card statement that includes one or more medical expenses. The inference engine would be interested in this data because itemized deductions may be possible and one or more tax forms will need to be populated if summing the medical purchases found on one or more credit card statements reaches a certain amount.

Figure 4:
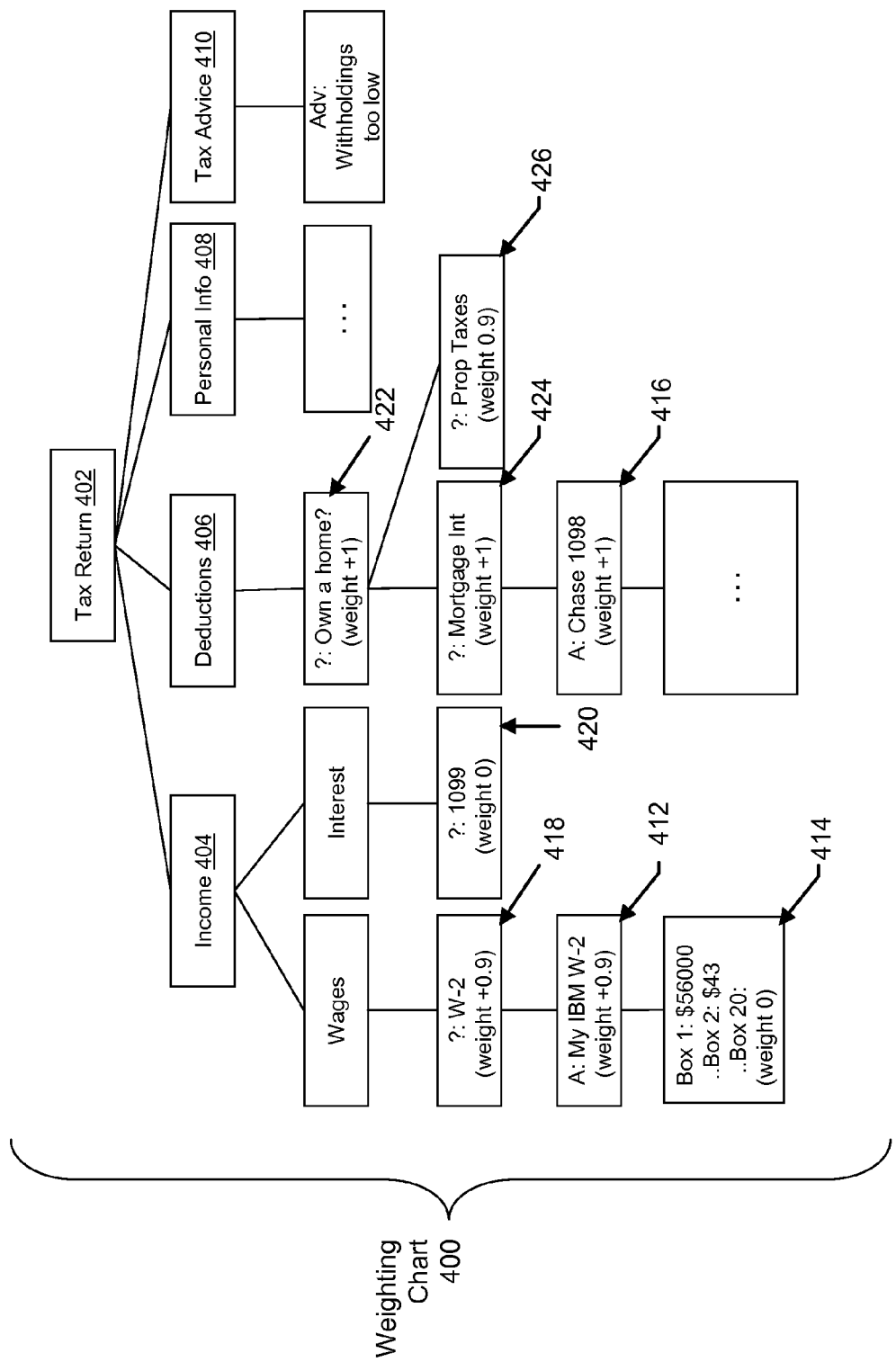
FIG. 4 shows a weighting chart in accordance with one or more embodiments of the invention.

In Step 202, confidence ratings are assigned to the tax data items in accordance with one or more embodiments of the invention. In one or more embodiments of the invention, confidence ratings may be a weight that reflects the confidence in the correctness or validity of the tax data item(s) as shown in FIG. 4 and described below. In one or more embodiments of the invention, the confidence is determined by logic found within the inference engine as well as inference rules. These inference rules may be established based on information complied from tax experts that capture rules for preparation and advice and the process of capturing the rules is in the form of a feedback loops so the rules consistently improve over time.

For example, tax data items from a tax form, such as a W-2 form of the current tax year, will receive a high confidence rating, while data from an older tax form, such as a W-2 from a prior year, would receive a lower confidence rating. In one or more embodiments of the invention, the inference engine may use inference rules to assign the confidence ratings. A confidence rating of 1 may be used to indicate that the tax data item is most likely correct, while a lesser rating, such as 0.6, may be used to indicate that the tax data item may be less likely to be correct. It will be apparent to one of ordinary skill in the art a variety of ways exist to assign confidence ratings and, as such, the invention should not be limited to the above examples.

In Step 204, relevancy ratings are assigned to tax questions in accordance with one or more embodiments of the invention. In one or more embodiments of the invention, tax questions may be a set of stored tax questions covering all aspects of taxes including at least tax preparation and tax advice. In one or more embodiments of the invention, relevancy ratings may be a weight that reflects how relevant the tax question is to the particular situation of the user as shown in FIG. 4 and described below. In one or more embodiments of the invention, the relevancy ratings are determined by logic found within the inference engine as well as inference rules. These inference rules may be established based on information complied from tax experts that capture rules for preparation and advice and the process of capturing the rules is in the form of a feedback loops so the rules consistently improve over time.

For example, questions relating to school expenses are extremely relevant to a student, thus receiving a high relevancy rating when the user is a student, but if the user is a retiree that same tax question may receive a low relevancy rating. Likewise, questions relating to home ownership are likely irrelevant to a user who rents an apartment, and thus may receive a low relevancy rating. In one or more embodiments of the invention, the inference engine may use inference rules to assign the relevancy ratings. A relevancy rating of 1 may be used to indicate that the tax question is more relevant, while a lesser rating, such as 0.5, may be used to indicate that the tax question may be less relevant. It will be apparent to one of ordinary skill in the art that there are a variety of ways to assign relevancy ratings and, as such, the invention should not be limited to the above examples.

In Step 206, a subset of tax questions is determined in accordance with one or more embodiments of the invention. In one or more embodiments of the invention, the subset of tax questions may be determined from a set of stored tax questions. The subset may be determined using the relevancy ratings assigned in Step 204. Further, the subset may be determined after presenting the subset to the user for validations, corrections, and/or additional input. In one or more embodiments of the invention, the subset may be all tax questions exceeding (above or below, depending on perspective) a particular threshold relevancy rating. Alternatively, the subset may initially include all of the stored tax questions. In one or more embodiments of the invention, the subset of tax questions may be updated each time a new tax data item or answer to a tax question is received. It will be apparent to one of ordinary skill in the art that there are a variety of ways to determine a subset of tax questions and, as such, the invention should not be limited to any of the above examples.

In Step 208, a tax question is personalized in accordance with one or more embodiments of the invention. In one or more embodiments of the invention, personalizing a tax question may involve altering the wording of a tax question, such as inserting tax data associated with the user. Personalizing a tax question may be done using inference rules, as well as tax data and confidence ratings. The inference rules may be established based on information complied from tax experts that capture rules for preparation and advice and the process of capturing the rules is in the form of a feedback loops so the rules consistently improve over time.

In one or more embodiments of the invention, the entire subset of tax questions may be personalized at the same time. Alternatively, one tax question may be personalized at a time, so that the most recently received tax data may be included. It will be obvious to one of ordinary skill in the art that there are many ways to personalize tax questions and, as such, the invention should not be limited to the above examples. In general, it will be apparent to one of ordinary skill in the art that the purpose of personalizing tax questions is to provide more accurate and relevant questions, reduce the amount of effort required by a user to file taxes, and to make the user feel that the tax preparation application knows the situation of the user and, as such, the invention should not be limited to the above examples.

In Step 210, tax advice is determined in accordance with one or more embodiments of the invention. In one or more embodiments of the invention tax advice may include a warning about the user being audited. Alternatively, tax advice may be a way to save money on your taxes. For example, tax advice may be to increase contribution to a 401K or other retirement account to reduce a tax burden (if the maximum pre-tax retirement contribution for the taxpayer or the taxpayer's spouse based on the current tax law has not been reached) or increase the number of exemptions claimed on the W-4 to avoid overpaying taxes. Another example of tax advice is suggesting a tax saving by using an available, unused tax credit (such as for buying a home, receiving a post-secondary education, etc.). In one or more embodiments of the invention, tax advice may be determined using inference rules, as well as tax data and confidence ratings. These inference rules may be established based on information complied from tax experts that capture rules for preparation and advice and the process of capturing the rules is in the form of a feedback loops so the rules consistently improve over time. It will be apparent to one of ordinary skill in the art that there are many ways to determine tax advice and, as such, the invention should not be limited to the above examples.

Figure 3:
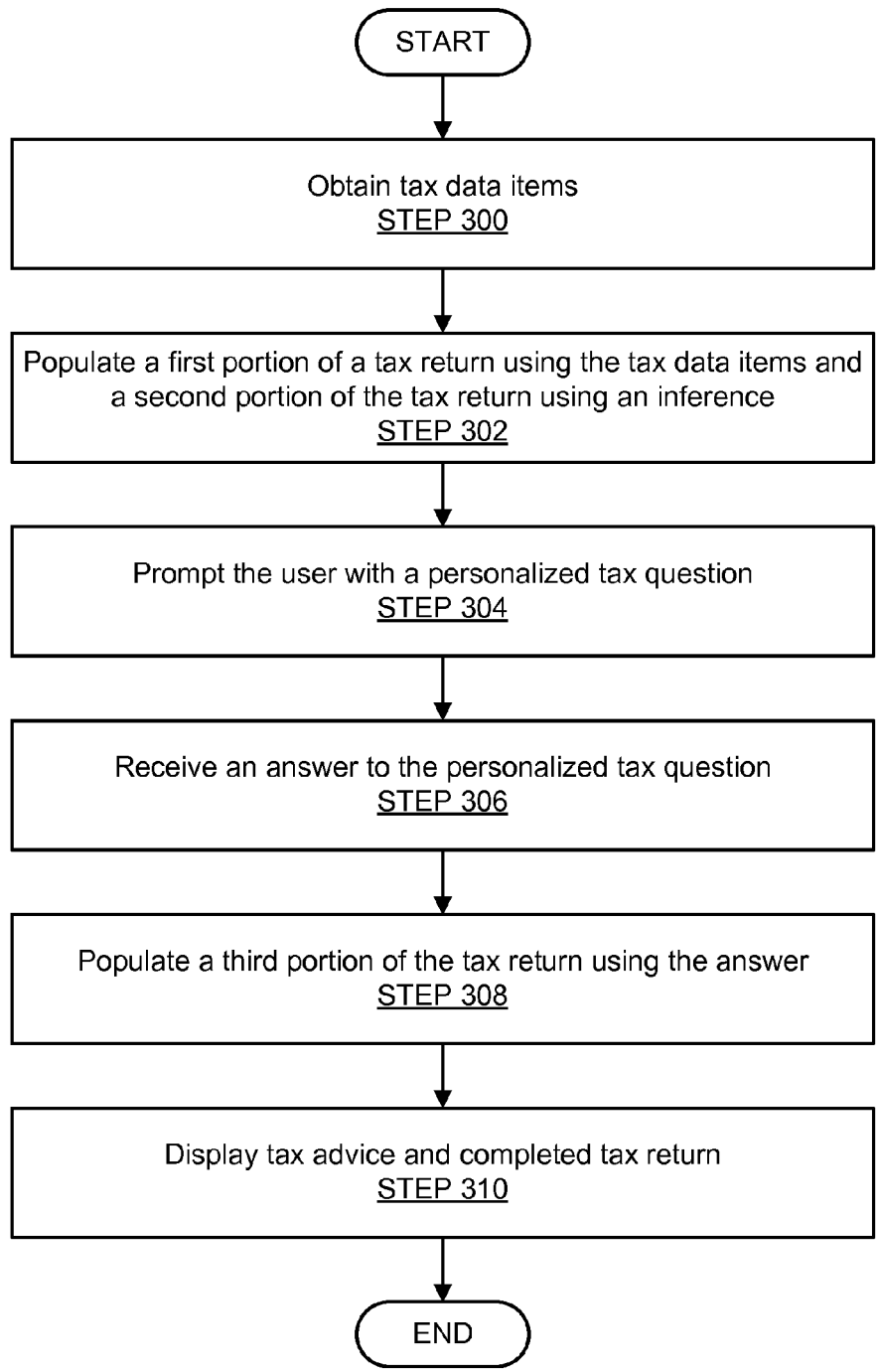
FIG. 3 shows a flowchart of a method for completing a tax return in accordance with one or more embodiments of the invention.

FIG. 3 shows a flowchart of a method for completing a tax return in accordance with one or more embodiments of the invention. The method of FIG. 3 may be implemented, for example, using the system of FIG. 1. In one or more embodiments of the invention, one or more of the steps shown in FIG. 3 may be omitted, repeated, and/or performed in a different order than the order shown in FIG. 3. Accordingly, the scope of the invention should not be considered limited to the specific arrangement of Steps shown in FIG. 3.

Initially, in Step 300, tax data items are obtained in accordance with one or more embodiments of the invention. In one or more embodiments of the invention, the tax data items may be obtained from one or more tax documents entered by the taxpayer or obtained from a tax data source. Examples of tax data sources may include a government agency, financial institution, employer, payroll company, stockbroker, previous tax return, receipts, credit card statements, bills, invoices, charitable contribution donation records, documents obtained through OCR techniques, documents obtain through screen scraping of websites, and/or any other supplier or source of tax data. As mentioned above, an example of tax data items that may be processed by an interference engine is credit card statement that includes one or more medical expenses. The inference engine would be interested in this data because itemized deductions may be possible and one or more tax forms will need to be populated if summing the medical purchases found on one or more credit card statements reaches a certain amount. The tax data items may be obtained in any order (including an order set by the user) and at any time. In other words, a user is not forced to enter any specific document at given time. In one or more embodiments of the invention, the tax data items may be automatically obtained. Alternatively, the user may submit documents or enter data directly.

In Step 302, a first and second portion of a tax return is populated in accordance with one or more embodiments of the invention. In one or more embodiments of the invention, the first portion may be populated using data obtained in Step 300, while the second portion may be populated using an inference. As described above, inferences may include, but are not limited to: inferring missing tax data, personalizing tax questions, prioritizing tax questions, providing warnings, providing tax advice, and any other relevant aspect. The population of the second portion of the tax return may be done using inference rules, as well as tax data and confidence ratings. The inference rules may be established based on information complied from tax experts that capture rules for preparation and advice and the process of capturing the rules is in the form of a feedback loops so the rules consistently improve over time. In one or more embodiments of the invention, the portions of the tax return may be populated in any order (including an order set by the user) and at any time.

In Step 304, the user is prompted with a personalized tax question in accordance with one or more embodiments of the invention. In one or more embodiments of the invention, a personalized tax question may be any tax question specifically tailored to the user. Because of the tailored nature of the questions, the user may feel that the tax preparation application "knows" the particular situation of the user. For example, the personalized tax question may change the standard, "Do you have any dependents?" question to, "Would you like to claim John and Sue as dependents?" Further, a personalized tax question may include tax questions that are prioritized according to the particular situation of the user. For example, rather than asking every user the same questions in the same order, if a user indicates that he or she rents an apartment and has dependants, then tax questions relating to dependants and/or renting may be prioritized higher than questions relating to owning a home. Other personalized tax questions or statements may include: "We found $3202 in medical expenses. Click to verify . . . ", "You weren't asked about child care expenses because you don't have children.", "You own a home, click here to download your property taxes.", and "You made donations last year. Click here if you had non-cash donations." It will be apparent to one of ordinary skill in the art that there are many ways to personalize tax questions and, as such, the invention should not be limited to the above examples.

In Step 306, an answer to the personalized tax question is received in accordance with one or more embodiments of the invention. In one or more embodiments of the invention, the answer may be received in any method known in the art. After receiving the answer, a third portion of the tax return is populated using the answer in accordance with one or more embodiments of the invention (Step 308). Finally, in Step 310, tax advice and a prepared tax return are displayed to the user in accordance with one or more embodiments of the invention. In one or more embodiments of the invention the tax advice and prepared tax return may be displayed through a GUI, displayed on a monitor or other display, or displayed through any other suitable method. Alternatively, the tax advice and prepared tax return may be printed, faxed, or displayed to the user in any other suitable way. Alternatively, the tax advice may include a warning, such as telling the user that there is a high risk of being audited. Tax advice may also suggest a tax saving by using an available, unused tax credit (such as for buying a home, receiving a post-secondary education, etc.) or by maximized the amount of pre-tax money place in a retirement account.

In one or more embodiments of the invention, examples of tax advice may include "By contributing up to $5000 to your retirement account (such as an IRA or 401K), you could save $1400 in taxes. Click for more . . . ", "By claiming 4 allowances on your W-4, you can avoid penalties next year. Click for more . . . ", "Using a Flexible Spending Account for your dependent care . . . you could save $480 dollars.", "Buying a home before Apr. 30, 2010 would save you $3,500 from the new home buyer's credit.", "One of your dependents will be 17 next year, . . . illustrate amount by which taxes will increase next year.", "Phase Out Savings: You didn't benefit from your rental losses this year, if you contribute more to your 401k you can get below the limit to use your rental losses.", "You can receive your Earned Income Credit ratably all year saving money on late fees and credit card interest . . . ", "You have a new child . . . know about the 529 savings plan? Want to learn more?", "Renting your home? Click here to see an estimate of tax savings for buying a home." It will be apparent to one of ordinary skill in the art that there are many kinds of advice, and as such, the invention should not be limited to the above examples.

FIG. 4 shows a weighting chart in accordance with one or more embodiments of the invention. It will be apparent to one of ordinary skill in the art that there are many potential ways to weight the confidence/relevance of data/questions and as such, the invention should not be limited to the following examples. The weighting chart (400) shoes a tax return (402) broken into a variety of sub-parts, including income (404), deductions (406), personal info (408), and tax advice (410). As can be seen in FIG. 4, various components show a weight attached to the tax data item provided through an answer (based on the confidence in the accuracy and validity of the answer) and a weight attached to the tax questions (based on the relevancy of the tax questions). The data provided through answers include the IBM W-2 (412) with a weight of +0.9, the boxes from within the IBM W-2 (414) with a weight of 0, and the data from the Chase 1098 (416) with a weigh of +1. The questions include the W-2 question (418) with a weight of +0.9, the 1099 question (420) with a weight of 0, the Own a home question (422) with a weight of +1, the Mortgage Interest question (424) with a weight of +1, and the Property Taxes question (426) with a weight of +0.9.

As discussed above, the weighting of the tax data items depends on the confidence in the accuracy and validity of the tax data items in accordance with one or more embodiments of the invention. Accordingly, the IBM W-2 answer (412), which is verified from a prior tax return is afforded a weight of +0.9 even though it is entered by the taxpayer. However, the boxes from within the IBM W-2 (414) is afforded a weight of 0 because the data was simply entered by the taxpayer and not given significant weight. The tax data item from the Chase 1098 (416) is given a weighting of +1 because the data is obtained directly from the financial institution. Based on the weighting of the tax data items, the tax data item(s) may then be used (or not used) to populate one or more tax forms.

As also discussed above, the weighting of the questions depend on the relevancy of the question in light of the personal info (not shown) and other information found in the current of prior tax returns. In this example, the Own a home question (422) is afforded a weight of +1 based on a prior year tax return (and possibly personal info), and likewise the Mortgage Interest question (424) is afforded a weight of +1 based on prior year returns and the fact that a 1098 tax form from the financial institution was downloaded. However, the Property Taxes question (426) is afforded a weight of +0.9 based on prior year tax returns having property taxes paid, but no further supporting information (such as a tax statement downloaded from the county or personal information entered by the user). Similarly, the 1099 question (420) is afforded a weight of 0 since nothing indicates the question is relevant for this tax return. Based on the relevance weighting of the questions, the question may then be used (or not used) while trying to populate one or more tax forms.

Figure 5:
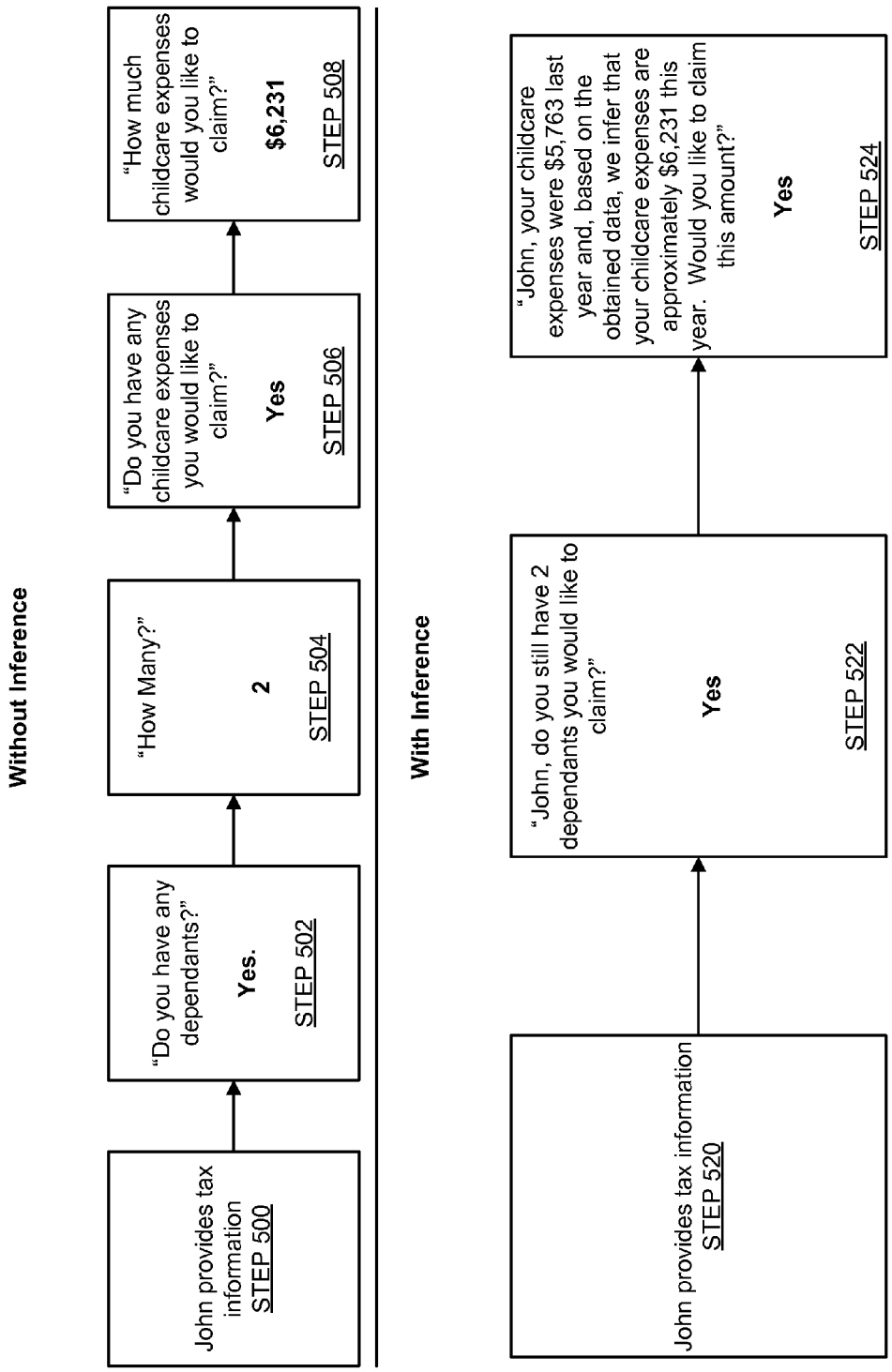
FIGS. 5 and 6 show examples in accordance with one or more embodiments of the invention.
Figure 6:
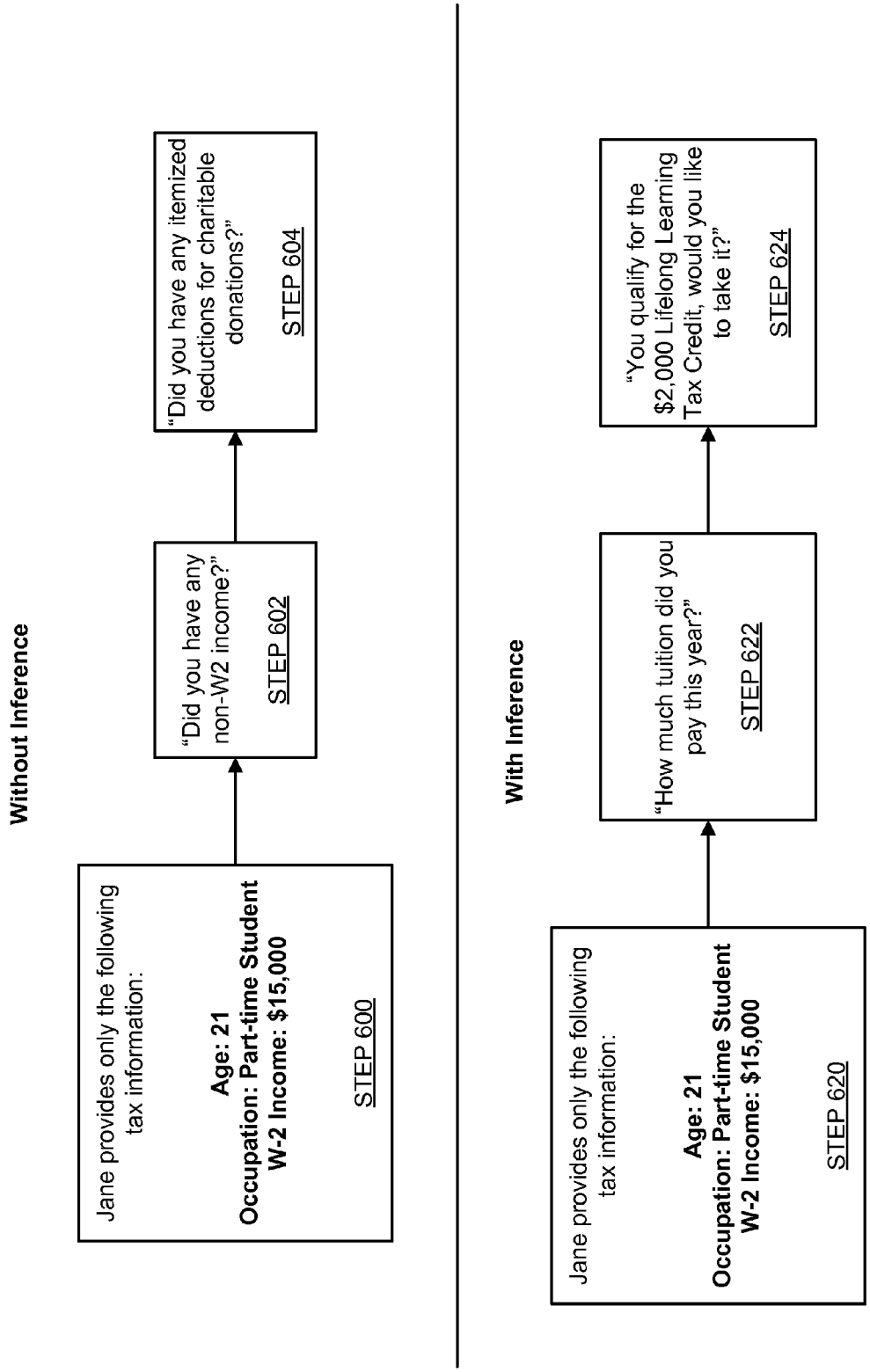

FIGS. 5 and 6 show examples in accordance with one or more embodiments of the invention. Specifically, FIG. 5 shows one example of how a tax question may be personalized to a user. FIG. 6 shows how tax questions may be prioritized to a user. It will be apparent to one of ordinary skill in the art that there are many potential ways to personalize, prioritize, and/or infer and, as such, the invention should not be limited to the following examples.

FIG. 5 shows how, in one or more embodiments of the invention, a tax preparation application may ask personalized questions about dependants. The line of questioning is shown with and without inference to provide a comparison that may be used to better understand the invention. Steps 500 through 508 show the process without inference, and Steps 520-524 show the process with inference.

Initially, in Step 500, John provides tax information. In one or more embodiments of the invention, as described above, the tax information is obtained from a variety of sources including, but not limited to, a government agency, financial institution, employer, payroll company, stockbroker, previous tax return, receipts, credit card statements, bills, invoices, charitable contribution donation records, documents obtained through OCR techniques, documents obtain through screen scraping of websites, and/or any other supplier or source of tax data. Alternatively, John may enter the tax information manually. For the purposes of this example, assume that the information provided was not complete with regards to dependants, and thus John must answer questions to complete that section of his tax return.

In Step 502, because inferences are not used, John is asked the same question as every other user of the tax preparation application, "Do you have any dependants?" to which he answers "Yes." John is then prompted to answer "How Many" dependants he has, to which he responds "2" (Step 504). The pre-defined, linear questioning continues in Step 506 asking, "Do you have any childcare expenses you would like to claim?" with John responding "Yes." Finally, the last question, "How much childcare expenses would you like to claim?" allows John to enter his answer of $6,231 (Step 508). It will be apparent to one of ordinary skill in the art that Steps 500-508 show a generic, linear process without inference(s) that each user of the tax preparation application views and must go through in order to prepare a tax return. Further, it will also be apparent to one of ordinary skill in the art that Steps 500-508 place the majority of the burden of gathering data about the user on the user.

In contrast, Steps 520-524 show the same line of questioning as Steps 500-508; however, inferences are now used, thereby streamlining the process and greatly reducing the burden of gathering data. In Step 520, John gathers his information. For the purposes of this example, John gathers his information exactly as he does in Step 400, including that the information provided is incomplete with regard to the dependants.

In Step 522, inferences are made, and the question asked to John is, "John, do you still have 2 dependants you would like to claim?" John's response is "Yes." In one or more embodiments of the invention, the inferences may have been made by an inference engine applying inference rules to the information provided by John. Specifically, the inference made in Step 522 may be that, because John had 2 dependants on the prior year's tax return, he is likely to have 2 dependants for this year's tax return as well. In one or more embodiments of the invention, the information associated with John's dependants was pre-populated for John in his tax return, and merely needed his validation. It will be apparent to one of ordinary skill in the art that this is only one example of the inferences that may be made and, as such, the invention should not be limited to the above example. Additionally, the question in Step 522 has also been personalized to John. For example, the question uses his name, and instead of just inquiring whether John has any dependants, the inference reflecting that John has 2 dependants is also found in the question Next, in Step 524, John is asked, "John, your childcare expenses were $5,763 last year and, based on the obtained data, we infer that your childcare expenses are approximately $6,231 this year. Would you like to claim this amount?" to which John answers "Yes." As in the previous step, inferences may have been made by applying inference rules to the tax information provided by John. Specifically, the inference made is that John's childcare expenses are $6,231. In one or more embodiments of the invention, this number may be derived from data received in Step 520 that is not "traditional" tax data, such as credit card statements or other financial information. For example, credit card statements may be processed to identify purchases that are likely related to childcare expenses, and the identified purchases may be added together to get the estimated childcare expenses. Alternatively, last year's childcare deduction may be multiplied by the increase in the consumer price index over the year to infer the current year childcare expenses, or any other suitable process may be used. It will be apparent to one of ordinary skill in the art that there are many ways to make an inference and, as such, the invention should not be limited to the above examples.

FIG. 6 shows how, in one or more embodiments of the invention, questions may be prioritized based on relevancy to the user. Like FIG. 5, FIG. 6 shows a line of questioning with and without inference to provide a comparison that may be used to better understand the present invention. Steps 600-604 show the "default" line of questioning for a tax preparation application (i.e., without inference), while Steps 620-624 show a line of question for a tax preparation application using inference.

Initially, in Step 600, Jane provides only three pieces of information to the tax preparation application, namely that she is 21, a part-time student, and had an income of $15,000 this tax year. It will be apparent to one of ordinary skill in the art that much more information is required to complete a tax return. In Step 602, the tax preparation application, without using inference, continues on its standard, linear path of questioning that each user of a tax preparation application sees. In this example, the first question asked is, "Did you have any non-W2 income?" More likely than not, Jane does not have any non-W2 income, as she is 21 years old and a part time student. However, because the tax preparation application in Steps 600-604 does not use inference, Jane is forced to follow the standard path and answer many questions that are completely irrelevant to her situation. Next, the standard, linear questioning continues at Step 604 asking, "Did you have any itemized deductions for charitable donations?" As in the previous step, an itemized deduction for charitable donations are, more likely than not, irrelevant to the situation of a 21 year old part-time student. It will be apparent to one of ordinary skill in the art that, while the example questions of Steps 602 and 604 may be relevant to some individuals in Jane's situation, there are other significantly more relevant questions that ideally would be asked first.

In contrast, Step 620-624 show the same process as Steps 500-504, but inferences are used. Initially, in Step 620, Jane provides the same three pieces of information to the tax preparation application as provided in Step 600, namely that she is 21, a part-time student, and had an income of $15,000 this tax year. In one or more embodiments of the invention, as soon as Jane enters this information, inferences are made based on the obtained information. Inferences may include, but are not limited to, inferring missing tax data, personalizing tax questions, prioritizing tax questions, providing warnings, providing tax advice, populating tax returns, and/or any other relevant aspect. For this example, the inference is prioritizing the ordering of the tax questions asked of Jane.

Based on the information entered and by applying inference rules, the tax preparation application Jane is using determines the most relevant question to Jane is, "How much tuition did you pay this year?" (Step 622). In one or more embodiments of the invention, the question in Step 622 may be the question with the highest weight after inference rules are applied.

After Jane enters her answer, the tax preparation application re-applies the inference rules to the entered information (Step 524). This time, the highest weight is for a piece of tax advice, telling Jane that, "You qualify for the $2,000 Lifelong Learning Credit, would you like to take it?" Obviously this is another highly relevant question to Jane's particular situation, and makes the user feel as though the tax preparation application is really aware of his or her actual situation.

Figure 7:
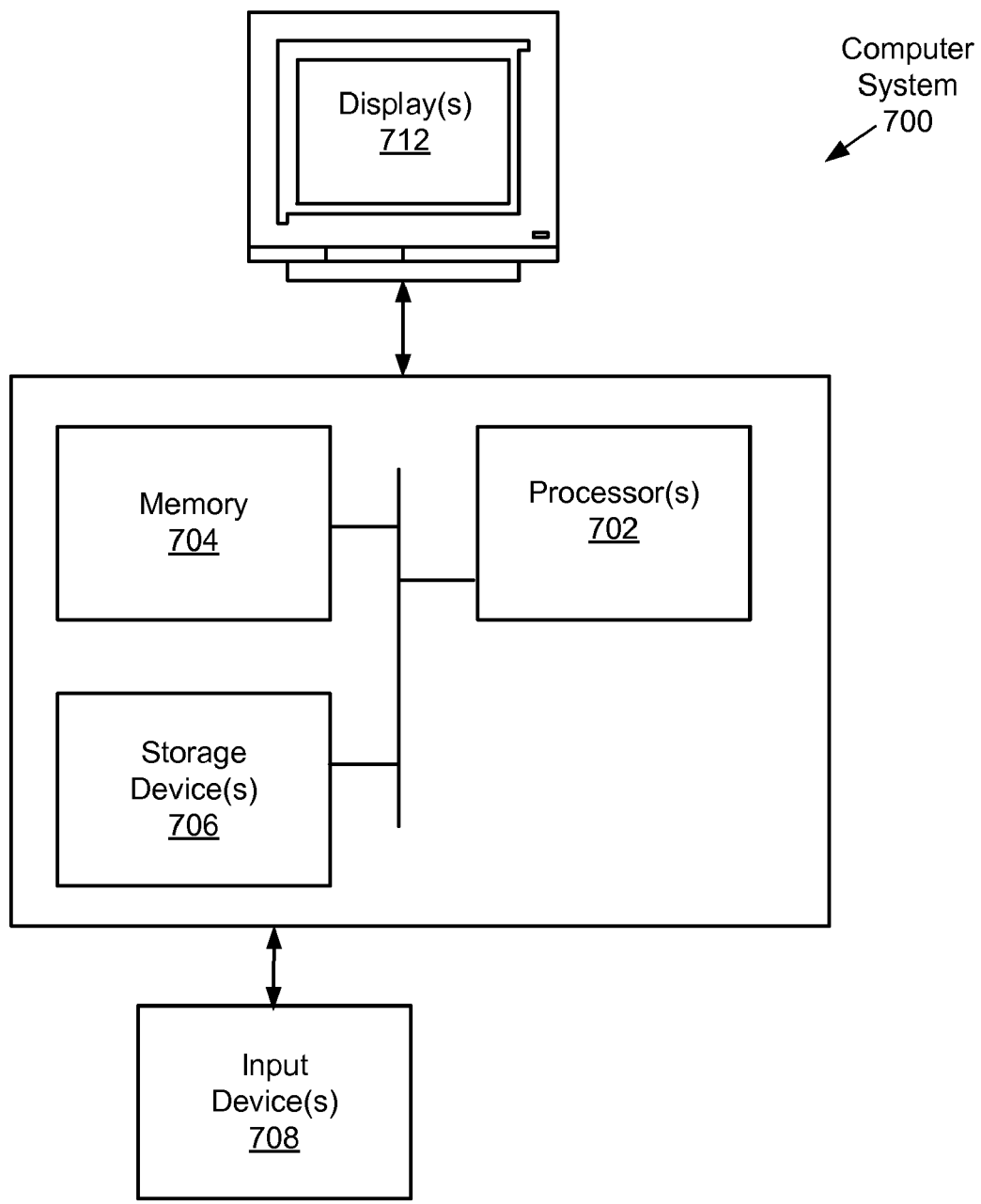
FIG. 7 shows a diagram of a computer in accordance with one or more embodiments of the invention.

One or more embodiments of the invention may be implemented on virtually any type of computer regardless of the platform being used. For example, as shown in FIG. 7, a computer system (700) includes a processor(s) (702) (such as an integrated circuit, central processing unit (CPU)), associated memory (704), a storage device(s) (706), and numerous other elements and functionalities typical of today's computers (not shown). The computer system (700) may also include input means, such as one or more input device(s)(708), and output means, such as one or more display(s) (712). The input device(s)(708) may include, for example, a keyboard, a mouse, a touch screen, a microphone, and/or any other suitable device for receiving input. The display(s) (712) may include, for example, a monitor, a touch screen, a Liquid Crystal Display (LCD) screen, and/or any other suitable method for displaying output. The computer system (700) is connected to a local area network (LAN) or a wide area network (e.g., the Internet) (not shown) via a network interface connection (not shown). Those skilled in the art will appreciate that these input and output means may take other forms. Additionally, in one or more embodiments of the invention, the computer system (700) may be a mobile device such as a laptop, mobile phone, smart phone, Personal Digital Assistant (PDA), or any other suitable device.

Further, those skilled in the art will appreciate that one or more elements of the aforementioned computer system (700) may be located at a remote location and connected to the other elements over a network. Further, one or more embodiments of the invention may be implemented on a distributed system having one or more nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a non-transitory computer readable storage medium such as a compact disc (CD), a diskette, a tape, or any other tangible computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for operating a tax inference engine within a tax preparation application, comprising:
    receiving, by the tax inference engine executing on a processor, a plurality of tax data items comprising an itemized credit card statement;
    identifying, using details of line items in the itemized credit card statement, at least one purchase that correlates to a situation in a user's personal life, wherein the situation is associated with personal data relevant to tax preparation;
    inferring, of the at least one purchase, that the situation exists, and updating the personal data to reflect the situation in the user's personal life;
    assigning, by the tax inference engine, a plurality of confidence ratings to a plurality of tax data items and the personal data by applying the plurality of inference rules;
    assigning, by the tax inference engine, a plurality of relevance ratings to a plurality of tax questions by applying the plurality of inference rules;
    determining a subset of the plurality of tax questions, wherein each tax question of the subset comprises a relevance rating of the plurality of relevance ratings that exceeds a threshold amount, and wherein the subset is ordered by the plurality of relevance ratings;
    personalizing a tax question of the subset using at least the plurality of inference rules, the plurality of tax data items, the personal data, and the plurality of confidence ratings, wherein personalizing the tax question alters a wording of the tax question; and
    determining, by tax inference engine within the tax preparation application, tax advice using at least the plurality of inference rules, the plurality of tax data items, the personal data and the plurality of confidence ratings.

2. The method of claim 1, further comprising:
    inferring an additional tax data item using the plurality of inference rules, the plurality of tax data items, and the plurality of confidence ratings.

3. The method of claim 2, wherein the additional tax data item is an identity of a primary taxpayer and an identity of a secondary taxpayer, and wherein the plurality of tax data items comprises data found on a tax form.

4. The method of claim 2, wherein the additional tax data item is a medical expense, and wherein inferring comprises summing a plurality of transactions in the credit card statement corresponding to medical purchases.

5. The method of claim 2, further comprising:
    populating a first portion of a tax return using the plurality of tax data items;
    populating a second portion of the tax return using the additional tax data items and personal data to create a populated tax return;
    receiving a correction to the additional tax data item; and
    updating the plurality of rules based on the correction.

6. The method of claim 2, wherein personalizing the tax question comprises inserting the additional tax data item into the tax question.

7. The method of claim 1, wherein determining tax advice, by the tax inference engine within the tax preparation application, comprises increasing a retirement account contribution to reduce a tax burden.

8. A method for completing a tax return within a tax preparation application, comprising:
    obtaining, by the tax preparation application executing on a processor, a plurality of tax data items for a user comprising an itemized credit card statement;
    identifying, using details of line items in the credit card statement, at least one purchase that correlates to a situation in a user's personal life, wherein the situation is associated with personal data relevant to tax preparation;
    inferring, of the at least one purchase, that the situation exists, and updating the personal data to reflect the situation in the user's personal life;

populating, by the tax preparation application, a first portion of the tax return using the plurality of tax data items and a second portion of the tax return using an inference based on the plurality of tax data items and the personal data;

prompting, by the tax preparation application, the user with a tax question of a plurality of tax questions, using at least a plurality of rules and the plurality of tax data items, wherein the tax question is personalized by altering a wording of the tax question, wherein the wording of the tax question is determined in part using the personal data, wherein the tax question is of a subset of the plurality of tax questions, and wherein the subset of the plurality of tax questions is ordered by a plurality of relevance ratings;

receiving an answer to the tax question;

populating, by the tax preparation application, a third portion of the tax return using the answer;

displaying, by the tax preparation application, a tax advice item to the user wherein the tax advice item is determined in part using the personal data; and displaying a prepared tax return to the user.

9. The method of claim 8, further comprising:

receiving validation of the prepared tax return from the user; and filing the prepared tax return electronically.

10. The method of claim 8, wherein the plurality of tax data items are obtained from a plurality of tax documents, and wherein the plurality of tax documents are obtained in an order set by the user.

11. The method of claim 8, wherein the tax advice item displayed by the tax preparation application comprises a tax saving, and wherein the tax saving comprises an available, unused tax credit.

12. The method of claim 8, wherein the tax advice item displayed by the tax preparation comprises increasing a retirement account contribution to reduce a tax burden.

13. A non-transitory computer readable storage medium comprising computer executable instructions for operating an inference engine within a tax preparation application, the instructions comprising functionality to:

receive a plurality of tax data items comprising an itemized credit card statement;

identify, using details of line items in the itemized credit card statement, at least one purchase that correlates to a situation in a user's personal life, wherein the situation is associated with personal data relevant to tax preparation;

infer, of the at least one purchase, that the situation exists, and updating the personal data to reflect the situation in the user's personal life;

assign a plurality of confidence ratings to the plurality of tax data items including the personal data by applying the plurality of inference rules;

assign a plurality of relevance ratings to a plurality of tax questions by applying the plurality of inference rules;

determine a subset of the plurality of tax questions, wherein each tax question of the subset comprises a relevance rating of the plurality of relevance ratings that exceeds a threshold amount, and wherein the subset is ordered by the plurality of relevance ratings;

personalize a tax question of the subset using at least the plurality of inference rules, the plurality of tax data items including the personal data and the plurality of confidence ratings, wherein personalizing the tax question alters a wording of the tax question; and determine tax advice using at least the plurality of inference rules, the plurality of tax data items including the personal data, and the plurality of confidence ratings.

14. The non-transitory computer readable storage medium of claim 13, the instructions further comprising functionality to:

infer an additional tax data item using the plurality of inference rules, the plurality of tax data items, and the plurality of confidence ratings.

15. The non-transitory computer readable storage medium of claim 14, wherein the additional tax data item is an identity of a primary taxpayer and an identity of a secondary taxpayer, and a second portion of the tax return using an inference based on the plurality of tax data items.

16. The non-transitory computer readable storage medium of claim 14, the instructions further comprising functionality to:

populate a first portion of a tax return using the plurality of tax data items;

populate a second portion of the tax return using the additional tax data item to create a populated tax return;

receive a correction to the additional tax data item; and update the plurality of rules based on the correction.

17. The non-transitory computer readable storage medium of claim 14, wherein personalizing the tax question comprises inserting the additional tax data item into the tax question.

18. A non-transitory computer readable storage medium comprising computer executable instructions for completing a tax return within a tax preparation application, the instructions comprising functionality to:

obtain a plurality of tax data items for a user comprising an itemized credit card statement;

identify, using details of line items in the credit card statement, at least one purchase that correlates to a situation in a user's personal life, wherein the situation is associated with personal data relevant to tax preparation;

infer, of the at least one purchase, that the situation exists, and updating the personal data to reflect the situation in the user's personal life;

populate a first portion of the tax return using the plurality of tax data items and a second portion of the tax return using an inference based on the plurality of tax data items;

prompt the user with a tax question of a plurality of tax questions, personalized using at least a plurality of rules and the plurality of tax data items, wherein personalized comprises altering a wording of the tax question, wherein the wording of the tax question is determined in part using the personal data, wherein the tax question is of a subset of the plurality of tax questions, and wherein the subset of the plurality of tax questions is ordered by a plurality of relevance ratings;

receive an answer to the tax question;

populate a third portion of the tax return using the answer;

display a tax advice item to the use wherein the tax advice item is determined in part using the personal data; and display a prepared tax return to the user.

19. The non-transitory computer readable storage medium of claim 18, the instructions further comprising functionality to:

receive validation of the prepared tax return from the user; and file the prepared tax return electronically.

20. The non-transitory computer readable storage medium of claim 18, wherein the plurality of tax data items are obtained from a plurality of tax documents, and wherein the plurality of tax documents are obtained in an order set by the user.

21. A system, comprising:
  a memory; and
  a processor, operatively connected to the memory, said processor comprising:
  a tax inference engine configured to:
    receive a plurality of tax data items comprising an itemized credit card statement; process the itemized credit card statement to identify using details of line items in the itemized credit card statement, at least one purchase that correlates to a situation in a user's personal life, wherein the situation is associated with personal data relevant to tax preparation;
    infer, of the at least one purchase, that the situation exists, and updating the personal data to reflect the situation in the user's personal life; assign a plurality of confidence ratings to the plurality of tax data items and the personal data by applying a plurality of inference rules;
    assign a plurality of relevance ratings to the plurality of tax questions by applying the plurality of inference rules;
    determine a subset of the plurality of tax questions, wherein each tax question of the subset comprises a relevance rating of the plurality of relevance ratings that exceeds a threshold amount and, wherein the subset is ordered by the plurality of relevance ratings;
    personalize a tax question of the subset using at least the plurality of inference rules, the plurality of tax data items and the personal data, and the plurality of confidence ratings, wherein personalizing the tax question alters a wording of the tax question; and
    determine tax advice using at least the plurality of inference rules, the plurality of tax data items and the personal data, and the plurality of confidence ratings; and
  a tax preparation application configured to:
    obtain the plurality of tax data items for a user;
    populate a first portion of a tax return using the plurality of tax data items and a second portion of the tax return using an inference based on the plurality of tax data items;
    prompt the user with the tax question of the subset;
    receive an answer to the tax question;
    populate a third portion of the tax return using the answer;
    display the tax advice to the user; and
    display a prepared tax return to the user.

22. The system of claim 21, further comprising functionality to:
  infer an additional tax data item using the plurality of inference rules, the plurality of tax data items, and the plurality of confidence ratings.

23. The system of claim 22, wherein the additional tax data item is an identity of a primary taxpayer and an identity of a secondary taxpayer, and wherein the plurality of tax data items comprises at least one tax form.

24. The system of claim 22, further comprising functionality to:
  populate a first portion of a tax return using the plurality of tax data items;
  populate a second portion of the tax return using the additional tax data item to create a populated tax return;
  receive a correction to the additional tax data item; and
  update the plurality of rules based on the correction.

25. The system of claim 22, wherein altering the wording comprises inserting the additional tax data item into the tax question.

26. The system of claim 21, further comprising an e-file service configured to:
  receive validation of the prepared tax return from the user; and
  file the prepared tax return electronically.

* * * * *